US012589720B2

(12) United States Patent
Alles et al.

(10) Patent No.:  US 12,589,720 B2
(45) Date of Patent:      Mar. 31, 2026

(54) BRAKING SYSTEM AND CURRENT DETECTION THEREFOR

(71) Applicant: Ford Global Technologies, LLC, Dearborn, MI (US)

(72) Inventors: Sheran Anthony Alles, Livonia, MI (US); Enrique Denicia, Miguel Hidalgo (MX)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 18/623,502

(22) Filed: Apr. 1, 2024

(65) Prior Publication Data

US 2025/0304020 A1      Oct. 2, 2025

(51) Int. Cl.
 B60T 8/171          (2006.01)
 B60Q 9/00           (2006.01)
 B60T 8/17           (2006.01)

(52) U.S. Cl.
 CPC .............. B60T 8/1701 (2013.01); B60Q 9/00 (2013.01); B60T 8/171 (2013.01)

(58) Field of Classification Search
 CPC ....... B60T 8/1701; B60T 8/1708; B60T 8/171
 USPC ............................................................ 701/70
 See application file for complete search history.

(56) References Cited

U.S. PATENT DOCUMENTS

| | | | |
|---|---|---|---|
| 8,344,541 B1 | 1/2013 | Li et al. | |
| 11,400,903 B2 | 8/2022 | Albright et al. | |
| 11,584,347 B2* | 2/2023 | Lucy ......................... | H02H 7/20 |
| 2002/0125771 A1* | 9/2002 | Kaminski ................ | B60D 1/62 |
| | | | 307/10.1 |

* cited by examiner

*Primary Examiner* — Erick R Solis
(74) *Attorney, Agent, or Firm* — Frank Lollo; Price Heneveld LLP

(57)                     ABSTRACT

A braking system includes drive circuitry configured to communicate a brake signal from a towing vehicle to a towed vehicle connected to the towing vehicle, an output node configured to carry the brake signal, and a switch electrically interposing the drive circuitry and the output node. A current detector is in series with the switch and is configured to detect a current through the drive circuitry. The switch is configured to electrically connect and electrically disconnect the drive circuitry from the output node in response to the current.

15 Claims, 4 Drawing Sheets

400

402 — Reverse Battery Condition

404 — Breakaway Switch Released

406 — Current Flows Toward Driver

408 — Reverse Current Detected By Current Sensor

410 — Switch Opened

412 — Notification Issued

BRAKING SYSTEM AND CURRENT DETECTION THEREFOR

FIELD OF THE DISCLOSURE

The present disclosure generally relates to a braking system and current detection therefor and, in particular, to a circuit for detecting condition of a trailer breakaway battery in reverse condition.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a braking system includes drive circuitry configured to communicate a brake signal from a towing vehicle to a towed vehicle connected to the towing vehicle, an output node configured to carry the brake signal, and a switch electrically interposing the drive circuitry and the output node. A current detector is in series with the switch and is configured to detect a current through the drive circuitry. The switch is configured to electrically connect and electrically disconnect the drive circuitry from the output node in response to the current.

Embodiments of the first aspect of the present disclosure can include any one or a combination of the following features:

- the output node is configured to electrically couple with a power source on the towed vehicle, the power source having a positive terminal and a negative terminal;
- in response to the output node being coupled with the negative terminal, the current detector detects current flowing through the drive circuitry;
- the current detector includes a shunt in series with the switch, and at least one current sense amplifier having programmable gain and configured to output a voltage representative of current through the shunt;
- a comparator configured to control the switch in response to the voltage representing the current flowing through the drive circuitry;
- the comparator is configured to disable the switch in response to the current flowing through the drive circuitry and a state of the drive circuitry;
- a latch circuit configured to keep the switch disabled following disabling of the switch;
- a controller in electrical communication with the current detector and configured to selectively release the latch circuit;
- a user interface configured to present an indication of a reverse-battery condition of the towed vehicle in response to detection of the current when the drive circuit is powered off; and
- the output node is electrically coupled with at least one brake of the towed vehicle configured to actuate in response to the brake signal.

According to a second aspect of the present disclosure, a braking system includes drive circuitry configured to communicate a brake signal from a towing vehicle to a towed vehicle connected to the towing vehicle, an output node configured to carry the brake signal, and a switch electrically interposing the drive circuitry and the output node. A current detector is in series with the switch and is configured to detect a current through the drive circuitry and toward the switch. The switch is configured to electrically connect and electrically disconnect the drive circuitry from the output node in response to the current.

Embodiments of the second aspect of the present disclosure can include any one or a combination of the following features:

- the output node is configured to electrically couple with a power source on the towed vehicle, the power source having a positive terminal and a negative terminal, wherein, in response to the output node being coupled with the negative terminal, the current detector detects current flowing through the drive circuitry;
- a shunt in series with the switch, and at least one current sense amplifier configured to output a voltage representative of current through the shunt;
- a comparator configured to control the switch in response to the voltage representing the current flowing through the drive circuitry;
- the comparator is configured to disable the switch in response to the current flowing through the drive circuitry;
- a latch circuit is configured to keep the switch disabled following disabling of the switch;
- a controller in electrical communication with the current detector and configured to selectively release the latch circuit;
- a user interface configured to present an indication of a reverse-battery condition of the towed vehicle in response to detection of the current flowing through the drive circuitry; and
- the output node is electrically coupled with at least one brake of the towed vehicle configured to actuate in response to the brake signal.

According to a third aspect of the present disclosure, a braking system includes a drive circuitry configured to communicate a brake signal from a towing vehicle to a towed vehicle connected to the towing vehicle, an output node configured to carry the brake signal, and a switch electrically interposing the drive circuitry and the output node. A current detector is in series with the switch and is configured to detect a current through the drive circuitry. The switch is configured to electrically connect and electrically disconnect the drive circuitry from the output node in response to the current. A shunt is in series with the switch. At least one current sense amplifier is configured to output a voltage representative of current through the shunt. A comparator is configured to control the switch in response to the voltage representing the current flowing through the drive circuitry.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
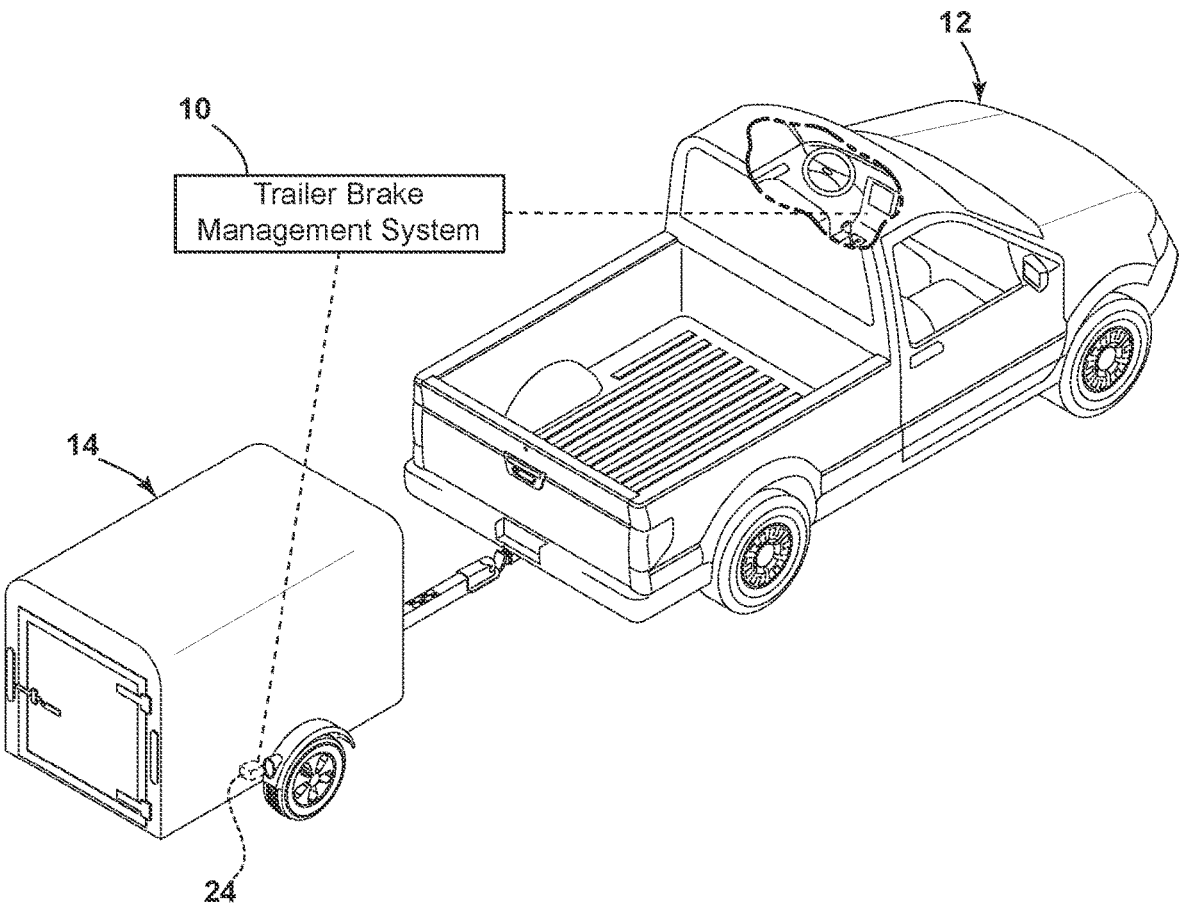
FIG. 1 is a perspective view of a towing arrangement between a towing vehicle and a towed vehicle with the towed vehicle incorporating a braking system controlling braking of the towed vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a braking system and current detection therefor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Referring generally to FIGS. 1-4, a trailer brake management system (TBMS 10), or braking system 10, is generally indicated at 10. In general, the TBMS 10 can utilize a hardware implementation to limit inoperability of driving circuitry in the event of customer testing of trailer operability when the trailer battery is in reverse. Accordingly, the present solution can limit overcurrent conditions of the TBMS 10. The TBMS 10 can further provide for enhanced reaction time to limit overcurrent conditions by implementing a responsive detection mechanism that can be implemented relatively simply. The TBMS 10 further provides for enhanced user interaction by providing notification of conditions of the TBMS 10 in response to overcurrent conditions, or another condition of the circuit. The TBMS 10 can further provide for enhanced detection by not being limited to wiring harness resistance when a reverse battery condition occurs.

With continued reference to FIGS. 1-4, a TBMS 10 includes drive circuitry 11 configured to communicate a brake signal from a towing vehicle 12 to a towed vehicle 14 connected to the towing vehicle 12. An output node 16 is configured to carry the brake signal. A switch 18 electrically interposes the drive circuitry 11 and the output node 16. A current detector 20 is in series with the switch 18 and is configured to detect a current through the drive circuitry 11. The switch 18 is configured to electrically connect and electrically disconnect the drive circuitry 11 from the output node 16 in response to the current.

Figure 2:
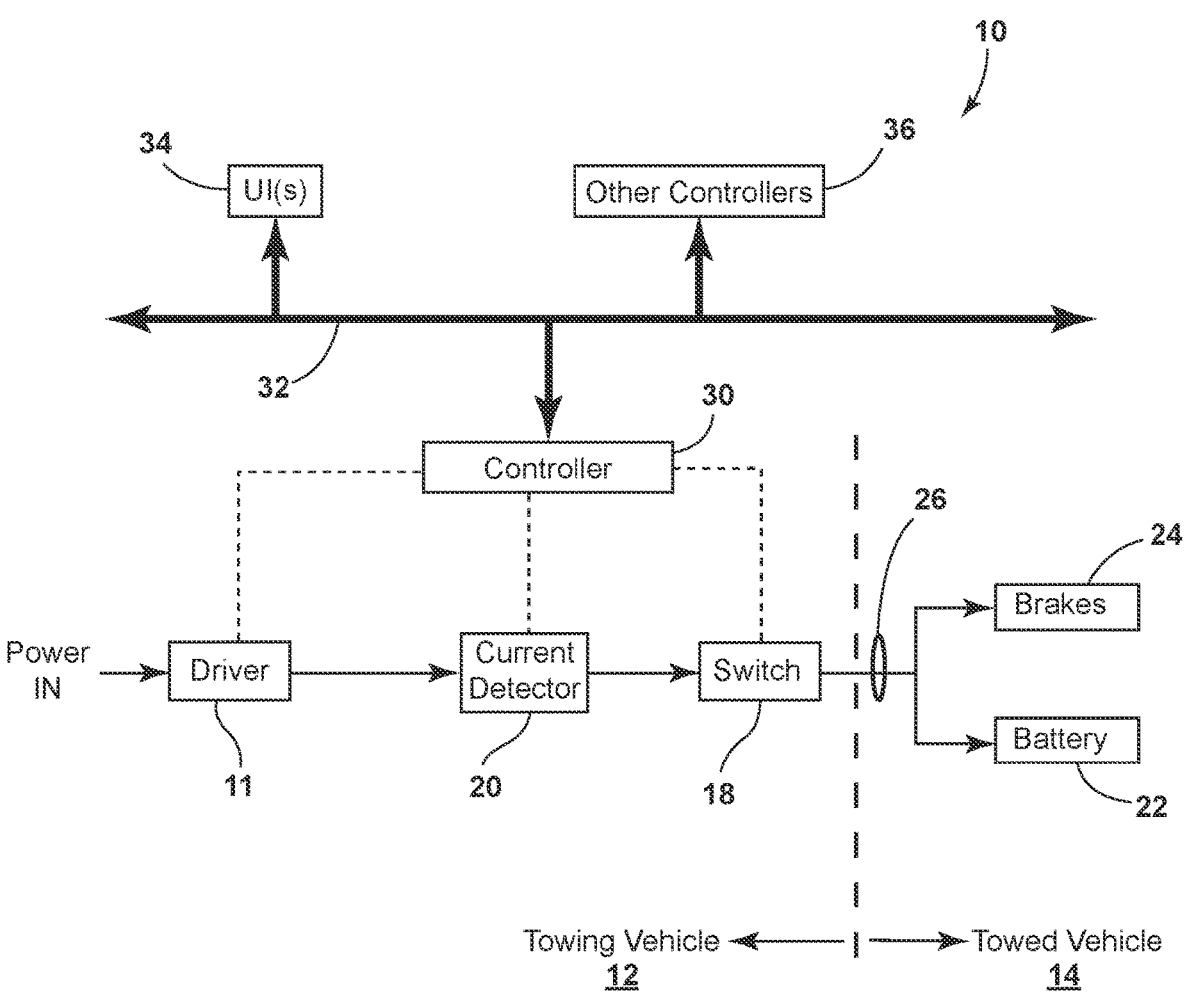
FIG. 2 is a functional block diagram of a braking system for controlling braking of a towed vehicle.
Figure 3:
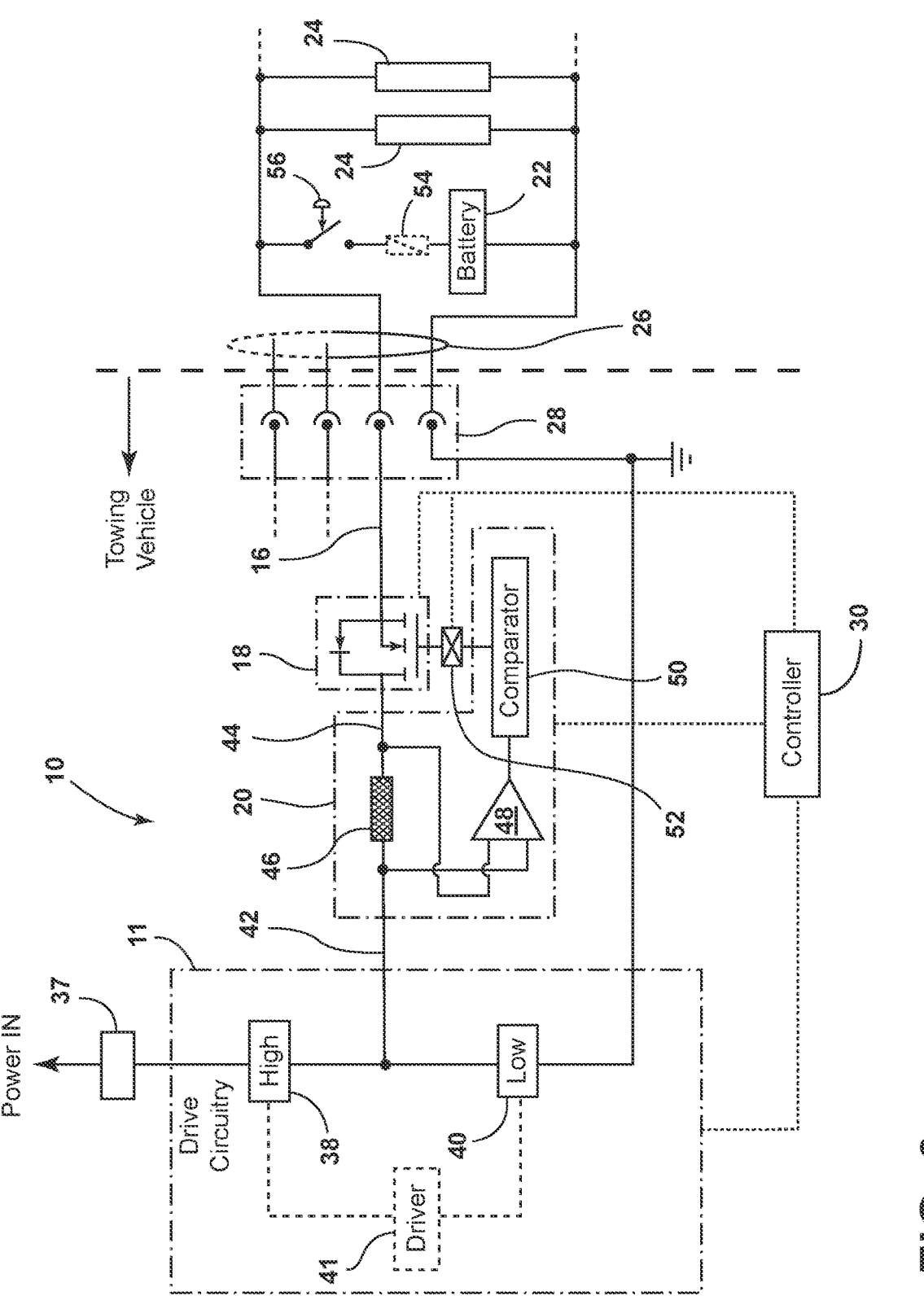
FIG. 3 is an electrical schematic of a braking system incorporating reverse-battery detection for a towed vehicle according to one aspect of the present disclosure.

Referring now to FIG. 1, the TBMS 10 can be controlled via the towing vehicle 12. As demonstrated, the towed vehicle 14 can operably couple with the towing vehicle 12, such that operation of the towing vehicle 12 (e.g., steering, braking, motion) can influence movement of the towed vehicle 14. In the present example, the towed vehicle 14 is a trailer, though it is contemplated that the towed vehicle 14 may be any towed vehicle 14 that can include a power source 22 (FIGS. 2 and 3). The TBMS 10 can be configured to communicate signals to the towed vehicle 14 in response to braking signals communicated via a brake system of the towing vehicle 12. Accordingly, the TBMS 10 may be a distributed module, such as a rear-zone module of the towing vehicle 12 that can be configured to control various aspects related to a rear portion of the vehicle, such as a backup camera, proximity sensors, door sensors, rear lights, etc. As will be described in detail herein, the TBMS 10 can include circuitry that, in response to braking signals from the brake system of the vehicle, communicates braking signals to the towed vehicle 14.

As demonstrated, the towing vehicle 12 can include one or more brakes 24 for controlling braking of the towed vehicle 14 that can actuate in response to receiving electrical signals. In some is contemplated that the brakes 24 of the towed vehicle 14 may be electromagnetic brakes 24 or electrical-or-hydraulic (EOH) brakes 24, or any other brake 24 that can actuate in response to electrical signals from the towed vehicle. Accordingly, electrical or EOH brakes are only examples of the types of brakes 24 that may be incorporated into the towed vehicle 14.

Referring now to FIG. 2, the drive circuitry 11 can include driving circuitry that manages and supplies target voltage or current to the electrical components of the towed vehicle 14. The drive circuitry 11 can include power modulators, sensing units, and/or filtering circuits to provide controlled modulated or constant signals to the electrical components of the towed vehicle. 14 The drive circuitry 11 may also, or alternatively, be configured to charge a power source 22 of the towed vehicle 14, such as a battery. The power source 22 can include any number of electrochemical cells and/or any type of power source 22, such as a lithium-ion battery, a lead-acid battery, or any other battery. The power source 22 can be charged by the drive circuitry 11 or another electrical connection 28 to the towed vehicle 14 in some examples.

The drive circuitry 11 can incorporate electrical components such as high-power transistors or other drive circuitry. For example, the drive circuitry 11 can incorporate circuitry that generates pulse-width modulated (PWM) signals to the brakes 24 of the towed vehicle 14. The drive circuitry 11 is configured to control the timing of the pulses to control the frequency of the signals to the brakes 24. In response, the brakes 24 can be configured to actuate at certain rates or braking levels based on the perceived frequency of brake signals. A current detector 20 is in-line with the switch 18 for measuring current between the drive circuitry 11 and electrical components of the towed vehicle 14, such as the power source 22 and the brakes 24.

A switch 18 is disposed in line with the current detector 20 for interrupting or controlling electrical connection 28 between the drive circuitry 11 and the components of the towed vehicle 14. As will be described further with reference to FIG. 3, the switch 18 can include any number of switching devices, such as transistors, relays, contactors, or any other electrical switching device. In some examples, the switch 18 is a high-speed switch 18, such as a metal oxide semiconductor field effect transistor (MOSFET) that can be electrically activated or deactivated depending on a signal to a gate of the MOSFET.

The components of the towed vehicle 14, such as the brakes 24 and the power source 22, are electrically coupled to the switch 18 when the towed vehicle 14 is electrically coupled with the towing vehicle 12. By way of example, a wiring harness 26 can be provided on the towed vehicle/device 14 for connection with the towing device vehicle for providing electrical interconnectivity between the towing vehicle 12 and the towed vehicle 14. For example, at least one electrical connection 28 (e.g., connectors, plugs) may be provided between the towing vehicle 12 and the towed vehicle 14 (FIG. 3) to establish electrical communication between them. The signals exchanged can include turning indicator signals, braking signals, power signals, neutral signals, ground, and/or any other electrical signal. For example, a seven-pin connector, a four-pin connector, a 13-pin connector, or any other type of connector may be provided between the towing vehicle 12 and towed vehicle 14. It is contemplated that the wiring harness 26 employed can provide electrical resistance. Accordingly, parallel voltage detection for overcurrent conditions can be limited to a range of detection. The in-line arrangement provided herein can therefore provide for a greater range of protection.

With continued reference to FIG. 2, a controller 30, which can incorporate a processor and at least one memory, can be in electrical communication with the drive circuitry 11, the current detector 20, and the switch 18, for controlling the drive circuitry 11, the current detector 20, and/or the switch 18. The controller 30 can also or alternatively receive data from the drive circuitry 11, the current detector 20, and/or the switch 18 that relates to conditions of the TBMS 10. By way of example, the memory of the controller 30 can store instructions that, when executed by the processor, cause the controller 30 to communicate one or more signals to, or read one or more signals from, the drive circuitry 11, the current detector 20, and/or the switch 18. For example, in operation, the controller 30 can communicate a control signal to the drive circuitry 11 to cause the drive circuitry 11 to communicate the brake signal or a charging signal to the components of the towed vehicle 14. The controller 30 can also monitor the current detector 20 to detect overcurrent or atypical current conditions and/or any voltage or current related to signals communicated between the drive circuitry 11 and the components of the towed vehicle 14 via the output node 16. The controller 30 can then be configured to control the switch 18 in response to current between the drive circuitry 11 and the current through the switch 18.

As will be described further in detail in reference to FIG. 3, the current detector 20 can include control features, such that control of the switch 18 can be based on signals from the current detector 20. In these examples, the controller 30 may not serve as an intermediary between the current detection and the switch 18. For example, in an overcurrent condition, the current detector 20 can directly communicate a signal to the switch 18 to open, or disconnect, communication between the components of the towed vehicle 14 and the drive circuitry 11. In other examples, the controller 30 processes signals from the current detector 20, and, in response to overcurrent conditions detected by the current detector 20, the controller 30 can communicate a signal to deactivate the switch 18. In still other examples, the controller 30 can control other aspects related to the current detector 20 (e.g., latching) to control opening or closing of the switch 18.

With continued reference to FIG. 2, the controller 30 can be in communication with other communication devices on a control area network (CAN 32) or other communication networks to allow the controller 30 to communicate with other systems of the towing vehicle 12. For example, a user interface can be provided on the CAN 32 for presenting information related to the status of the TBMS 10. By way of example, overcurrent conditions, negative current conditions, or any other current- or power-related conditions about the TBMS 10 can be presented at the user interface. It is also contemplated the control that the controller 30 can be in communication with other controllers 36 on the CAN 32, such as a main braking controller for the towing vehicle 12. Accordingly, while demonstrated as a single controller 30 in the present example, it is contemplated that the single controller may be omitted or replaced by the main braking controller for the towing vehicle 12. In the present example, the controller 30 is part of a rear zonal module for the towing vehicle 12.

Referring now to FIG. 3, a more detailed schematic of the TBMS 10 is demonstrated. The TBMS 10 can include an upstream switch 17 (e.g., a MOSFET and/or diode) that limits electrical current from flowing from the drive circuitry 11 to the power supply. For example, in the event of a reverse battery condition in which the vehicle 12 is on and a trailer 14 is connected, when the breakaway switch 54 is pulled, reverse current is limited from backflowing through the upstream switch 17.

With continued reference to FIG. 3, the drive circuitry 11 can include a high-side drive circuit 38 and a low-side drive circuit 40 that are each controlled by processing circuitry within or separate from the drive circuitry 11 to produce the PWM signal (e.g., a modulating unit). The drive circuitry 11 can include a dedicated driver 41 configured to activate the high-side drive circuit 38 and the low-side drive circuit 40. For example, the driver 41 can be configured to drive gates of transistors in each of the drive circuits 38, 40. The high-side drive circuit 38 can be configured to activate when the low-side drive circuit 40 is deactivated, and vice versa. The activation of the drive circuits 38, 40 can operate in synchronous switching mode with deadtime control to minimize the power dissipation of the low-side drive circuit 40 during recirculation. By controlling the high-side drive circuit 38 and the low-side drive circuit 40, the PWM signal can be communicated via a first node 42 to the current detector 20. Each of the high-side drive circuits 38 and the low-side drive circuit 40 can include a transistor, such as a MOSFET. Each drive circuit 38, 40 can include a body diode. For example, the low-side drive circuit 40 can include a body diode in parallel with a transistor, with the diode being biased from the ground node toward the first node. The high-side drive circuit 38 can include a body diode biased from the first node 42 toward power input to the drive circuitry 11.

Interposing the current detector 20 and the switch 18 is a second node 44. Interposing the switch 18 and the components of the trailer is the output node 16. Thus, in standard operation, brake signals can be communicated from the drive circuitry 11 to the components of the towed vehicle 14 (e.g., the brakes 24), via the first node 42, second node 44, and the output node 16. When an overcurrent or nonstandard current condition (e.g., a large positive (or negative) current) is detected via the current detector 20, the switch 18 (or 37) can open to limit electrical communication between the output node 16 and the first and second nodes 44 (or Power IN). Although the current detector 20 is demonstrated electrically interposing the drive circuitry 11 and the switch 18, it is contemplated that the current detector 20 or another current sensing device can electrically interpose the switch 18 and the components of the towed vehicle 14.

In operation, the drive circuitry 11 controls the high-side drive circuit 38 and the low-side drive circuit 40 to provide the PWM signals (e.g., the brake signal). The PWM signals are generated by selectively connecting the first node 42 with power to the drive circuitry 11 by activation of the high-side circuit and connecting the first node 42 to neutral, or ground, via activation of the low-side drive circuit 40. The pattern of activations between the high-side drive circuit 38 in the low-side drive circuit 40 can generate this specific duty cycle/frequency for the braking signal communicated to the brakes 24, via the switch 18. For example, light braking may correspond to a lower duty cycle of the PWM signal, whereas an intense brake signal can result in a higher duty cycle PWM signal communicated to the brakes 24. In this way, the drive circuitry 11 can react to signals from the controller 30 and/or the other controllers 36. It is contemplated that, while this example demonstrates a one-to-one braking scenario, with intense braking on the towing vehicle 12 corresponding to intense braking of the towed vehicle 14, and vice versa, it is contemplated that other braking strategies may be employed by the TBMS 10. For example, more advanced braking techniques may be employed to limit or optimize movement of the towed vehicle 14 and the towing vehicle 12 (e.g., different braking frequencies for a common braking input level).

With continued reference to FIG. 3, the current detector 20 can include a shunt 46, such as a resistor or hall sensing element, that is in series with the switch 18. A current sense amplifier 48 is provided in parallel with the shunt 46 for detecting a voltage across the shunt 46. The current sense amplifier 48 can include an operational amplifier with a programmable gain and/or a gain set by the controller 30. The voltage across the shunt 46 corresponds to a current level through the shunt 46, and therefore a current through the or between the drive circuitry 11 and the components of the towed vehicle 14. The output of the current sense amplifier 48 can be an analog voltage representative of the current. The other components may be included in the current detector 20 for limiting/filtering high-frequency switching signals. For example, because the PWM signals may be relatively fast acting in terms of shifting between ON and OFF states, the current detector 20 can include one or more capacitors, inductors, and/or resistors to extract specific current conditions that may be monitored by a comparator 50 of the current detected. The comparator 50 can include one or more other operational amplifiers, logic gates, a processor, or another device to compare the output of the current sense amplifier 48, which corresponds to the current flowing through the shunt 46, to a power threshold.

The power threshold could be signed or unsigned. For example, the power threshold can be a negative value (e.g., current flowing toward the drive circuitry 11) or a positive current value (e.g., current flowing toward components of the towed vehicle 14). In response to the comparison, the comparator 50 can be configured to communicate a control signal to the switch 18 to deactivate or activate the switch 18 in response to the comparison. In other examples, the comparator 50 communicates the comparison to the controller 30, and the controller 30 communicates the control signal to the switch 18. In either example, the switch 18 can be controlled with relatively low delay from occurrence of the current.

For example, a delay between an atypical or overcurrent condition detected at the shunt 46 and deactivation of the switch 18 can be between 5 micro-seconds ($\mu s$) and 100 $\mu s$. In some examples, the delay is less than 60 $\mu s$. In some examples, the delay is between 5 $\mu s$ and 60 $\mu s$. The atypical or overcurrent conditions can include currents being over/under a threshold current. For example, if the current is detected as flowing toward the drive circuitry 11 through the ground node (e.g., in a reverse battery condition), the switch 18 can be controlled to be deactivated. In addition, the upstream switch 37 can be deactivated in response to any current that flows through the high-side drive circuit 38. In some examples, the upstream switch 17 includes a diode biased against the driving circuitry 11 to limit current from flowing from the drive circuitry 11 toward the power supply. For example, in the vehicle OFF state, the switch 18 and the upstream switch 37 can be in a deactivated state. By providing a quick reaction time to the detection of the current conditions, the drive circuitry 11 can be limited from experiencing overcurrent, thereby limiting inoperable conditions of the drive circuitry 11. It is contemplated that the switch 18 can be normally-open or normally-closed, such that the control signal can cause activation or deactivation of the switch 18.

It is contemplated that the interruption provided by the switch 18 can interrupt uncontrolled and/or backfeed current from returning to the trailer 14. For example, when the breakaway switch 56 is closed while the towed vehicle 14 is electrically coupled with the towing vehicle 12 and the vehicle is parked, the low-side drive circuit 40 can be activated to connect the drive circuitry 11 to chassis ground. Because the drive circuitry 11 is connected to ground (or in OFF state, the body diode connects the first node 42 with ground) in this example, when the breakaway switch 56 is pulled with a reversed power source 22 (e.g., the circuit is closed), current from the power source 22 can travel from the positive terminal of the battery, through the ground node, through the low-side drive circuit 40, and through the first node 42. In this example, the current detector 20 and switch 18 arrangement limits the current from reaching the output node 16. As previously described, current may flow through the high-side drive circuitry 38 due to its body diode, but current can be limited from flowing toward the power input by interruption of current via the upstream switch 37.

In vehicle OFF state, switch 18 is OFF, so the external reverse battery condition has no current path. The issue is when 18 is ON. The present strategy is to disable/latch off the switch 18 and present a message onscreen for the user to be notified of the reverse battery condition. The user can then acknowledge the message (e.g., via a user input) prior to the latch being disabled. In some examples, the voltage of the output node 16 is monitored by the controller 30 to determine if a condition to reset of the switch 18 is present. Various reset conditions may be implemented.

With continued reference to FIG. 3, a latch circuit 52 can be provided in the detector or in communication with detector to maintain a deactivation state of the switch 18 following a deactivation condition. For example, the latch circuit 52 can include one or more logic gates including transistors that can control setting and resetting of the control signal. Accordingly, the switch 18 can be held open following the open condition to limit further attempts to re-create the conditions that resulted in the open condition. By way of example, a user may connect a battery of the towed device in reverse (e.g., a negative terminal of the battery connected to the output node 16 and a positive terminal of the battery connected to the chassis). It is contemplated that, as demonstrated in FIG. 3, an in-line fuse 54 or circuit breaker and/or a breakaway switch 56 can interpose the output node 16 and the battery. Therefore, the connection between the output node 16 and the battery can include one or more intermediate nodes. When the user disconnects the breakaway switch 56 to close the circuit, current can flow from the battery through the ground node, the low-side drive circuit 40, and through the current detector 20. In response to the current, the current detector 20 can activate or deactivate the switch 18 to limit the overcurrent condition. The controller 30 can also monitor a state of the drive circuitry (e.g., activation of the high-side drive circuit 38), to determine the reverse battery condition. For example, if current is detected flowing through the switch 18 when the high-side drive circuitry 38 is not activated, the controller 30 can determine the reverse battery condition. The latch circuit 52 can maintain the switch 18 in an interrupted condition following the switch 18 being OFF.

The controller 30 can provide a reset signal to the latch circuit 52 to interrupt latch circuit 52 in response to one or more conditions, such as a user override, a time delay, an electrical condition, a check of the system 10, or the like. For example, the controller 30 can communicate a voltage or current to the latch circuit 52 to unlatch the control signal from the switch 18 to cause the switch 18 to be activated. Conversely, the controller 30 can be configured to track a count of the number of resets within a period of time and limit resetting of the latch following a predetermined number of resets. Following reaching the reset limit, the controller 30 can communicate an indication to the notification device for the user to not re-attempt a test of the power source 22 without adjustment. As will be described with respect to FIG. 4, following latching of the latch circuit 52, the user can be notified via the user interface 34 or another notification device that a reverse battery condition has been detected. For example, because the controller 30 may monitor the latch and/or the detector. The current detector 20 and/or the switch 18, and/or the drive circuitry 11, the controller 30 can communicate information to the other controllers 36 and/or the user interface 34 to notify the user of the conditions of the TBMS 10. In this way, the user can be made aware of one or more conditions of the towing vehicle 12.

Figure 4:
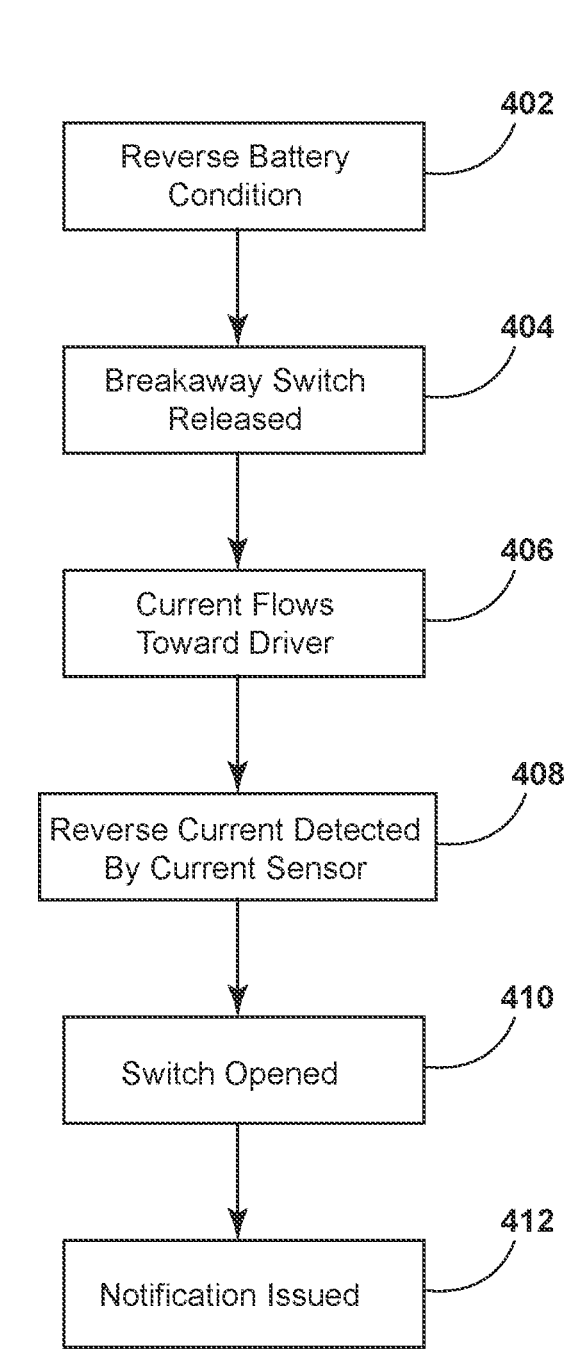
FIG. 4 is a process flow diagram of a method for detecting and indicating a reverse-battery of a towed vehicle.

Referring now to FIG. 4, a process 400 for identifying and notifying reverse conditions of the power source 22 is demonstrated. At step 402, a reverse battery condition is present. For example, the user may connect the battery in reverse (e.g., positive to negative and negative to positive). At step 404, the breakaway switch 56 can be released. For example, the user can disconnect the breakaway switch 56 to test brake functionality in the event the towed vehicle 14 is electrically decoupled from the towing vehicle 12. Accordingly, the user can simulate this condition by disconnecting the breakaway switch 56 after the battery is installed. In this condition, current can backflow toward the drive circuitry 11 through the ground node, the low-side drive circuit 40, and the current detector 20 at step 406. At step 408, the reverse current is detected by the current detector 20, and the switch 18 is opened at step 410. At step 412 a notification is presented to the user via, for example, the user interface 34. By way of example, the controller 30 can communicate an indication of a signal to a notification device indicating the reverse battery condition.

In general, the TBMS 10 herein may limit overcurrent conditions and provide for notification of reverse-battery installation conditions.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A braking system, comprising:

drive circuitry configured to communicate a brake signal from a towing vehicle to a towed vehicle connected to the towing vehicle;

an output node configured to carry the brake signal, wherein the output node is configured to electrically couple with a power source on the towed vehicle, the power source having a positive terminal and a negative terminal;

a switch electrically interposing the drive circuitry and the output node;

a current detector in series with the switch and configured to detect a current through the drive circuitry, wherein the switch is configured to electrically connect and electrically disconnect the drive circuitry from the output node in response to the current, wherein, in response to the output node being coupled with the negative terminal, the current detector detects current flowing through the drive circuitry, the current detector comprising:

a shunt in series with the switch; and at least one current sense amplifier having programmable gain and configured to output a voltage representative of current through the shunt; and a comparator configured to compare a voltage drop across the shunt and to control the switch in response to the voltage representing the current flowing through the drive circuitry.

2. The braking system of claim 1, wherein the comparator is configured to disable the switch in response to the current flowing through the drive circuitry and a state of the drive circuitry.

3. The braking system of claim 2, further comprising:

a latch circuit configured to keep the switch disabled following disabling of the switch.

4. The braking system of claim 3, further comprising:

a controller in electrical communication with the current detector and configured to selectively release the latch circuit.

5. The braking system of claim 2, further comprising:

a user interface configured to present an indication of a reverse-battery condition of the towed vehicle in response to detection of the current when the drive circuitry is powered off.

6. The braking system of claim 1, wherein the output node is electrically coupled with at least one brake of the towed vehicle configured to actuate in response to the brake signal.

7. A braking system, comprising:

drive circuitry configured to communicate a brake signal from a towing vehicle to a towed vehicle connected to the towing vehicle;

an output node configured to carry the brake signal;

a switch electrically interposing the drive circuitry and the output node;

a current detector in series with the switch and configured to detect a current through the drive circuitry and toward the switch, wherein the switch is configured to electrically connect and electrically disconnect the drive circuitry from the output node in response to the current-, the current detector comprising:

a shunt in series with the switch; and at least one current sense amplifier having programmable gain and configured to output a voltage representative of current through the shunt; and a comparator configured to compare a voltage drop across the shunt and to control the switch in response to the voltage representing the current flowing through the drive circuitry.

8. The braking system of claim 7, wherein the output node is configured to electrically couple with a power source on the towed vehicle, the power source having a positive terminal and a negative terminal, wherein, in response to the output node being coupled with the negative terminal, the current detector detects current flowing through the drive circuitry.

9. The braking system of claim 7, wherein the comparator is configured to disable the switch in response to the current flowing through the drive circuitry.

10. The braking system of claim 9, further comprising:

a latch circuit is configured to keep the switch disabled following disabling of the switch.

11. The braking system of claim 10, further comprising:

a controller in electrical communication with the current detector and configured to selectively release the latch circuit.

12. The braking system of claim 9, further comprising:

a user interface configured to present an indication of a reverse-battery condition of the towed vehicle in response to detection of the current flowing through the drive circuitry.

13. The braking system of claim 7, wherein the output node is electrically coupled with at least one brake of the towed vehicle configured to actuate in response to the brake signal.

14. A braking system, comprising:

drive circuitry configured to communicate a brake signal from a towing vehicle to a towed vehicle connected to the towing vehicle;

an output node configured to carry the brake signal;

a switch electrically interposing the drive circuitry and the output node;

a current detector in series with the switch and configured to detect a current through the drive circuitry, wherein the switch is configured to electrically connect and electrically disconnect the drive circuitry from the output node in response to the current, the current detector comprising:

a shunt in series with the switch; and at least one current sense amplifier configured to output a voltage representative of current through the shunt; and a comparator configured to compare a voltage drop across the shunt and to control the switch in response to the voltage representing the current flowing through the drive circuitry.

15. The braking system of claim 14, wherein the current protector is configured to detect the current through the drive circuitry and toward the switch.

* * * * *